United States Patent
Bernardo

(10) Patent No.: US 9,015,949 B2
(45) Date of Patent: Apr. 28, 2015

(54) DEVICE FOR PREVENTING TWISTING OF A STRAP OF A SAFETY SEAT AND METHOD FOR USING SAME

(71) Applicant: Jeannine Bernardo, Nesconset, NY (US)

(72) Inventor: Jeannine Bernardo, Nesconset, NY (US)

( * ) Notice: Subject to any disclaimer, the term of this patent is extended or adjusted under 35 U.S.C. 154(b) by 301 days.

(21) Appl. No.: 13/644,810

(22) Filed: Oct. 4, 2012

(65) Prior Publication Data

US 2013/0152362 A1 Jun. 20, 2013

Related U.S. Application Data

(60) Provisional application No. 61/622,352, filed on Apr. 10, 2012, provisional application No. 61/543,124, filed on Oct. 4, 2011.

(51) Int. Cl.
*B21D 53/88* (2006.01)
*B60R 22/10* (2006.01)
*B60R 22/00* (2006.01)

(52) U.S. Cl.
CPC ........... *B60R 22/10* (2013.01); *Y10T 29/49826* (2013.01); *Y10T 428/13* (2013.01); *B60R 22/00* (2013.01); *B60R 22/105* (2013.01); *B60R 2022/006* (2013.01)

(58) Field of Classification Search
CPC .. B60R 22/10; B60R 2022/006; B60R 22/00; B60R 22/105; B60R 22/024; B60R 22/14; B60R 22/12; B60N 2/2812; Y10T 29/49826
USPC ............. 29/897.2; 297/482, 483, 219.12
See application file for complete search history.

(56) References Cited

U.S. PATENT DOCUMENTS

| | | | | |
|---|---|---|---|---|
| 3,306,662 | A * | 2/1967 | Finnigan | 297/482 |
| 5,178,439 | A * | 1/1993 | McCracken | 297/482 |
| 5,335,957 | A * | 8/1994 | Golder | 297/482 |
| 2007/0210639 | A1* | 9/2007 | Berger et al. | 297/470 |

FOREIGN PATENT DOCUMENTS

WO WO 2005000626 A1 * 1/2005

* cited by examiner

*Primary Examiner* — David Bryant
*Assistant Examiner* — Ruth G Hildalgo-Hernande
(74) *Attorney, Agent, or Firm* — Ryan, Mason & Lewis, LLP

(57) ABSTRACT

A method for preventing twisting of a strap of a car seat, the method comprising receiving the strap through a body portion of a device, wherein the body portion includes opposite open ends, and wherein the strap extends through the body portion and protrudes from each of the ends, and positioning the device below at least one of a chest clip and a bottom clip coupled to the strap.

9 Claims, 4 Drawing Sheets

DEVICE FOR PREVENTING TWISTING OF A STRAP OF A SAFETY SEAT AND METHOD FOR USING SAME

CROSS-REFERENCE TO RELATED APPLICATIONS

This application claims the benefit of U.S. Provisional Patent Application Ser. No. 61/543,124, filed on Oct. 4, 2011, and U.S. Provisional Patent Application Ser. No. 61/622,352, filed on Apr. 10, 2012, the contents of which are herein incorporated by reference in their entirety.

BACKGROUND

1. Technical Field

The present disclosure relates to a device that is applied to a harness strap of safety seat, such as a child safety seat for use in an automobile, to keep the strap in a proper orientation and to prevent the strap from twisting, and a method for using same.

2. Discussion of the Related Art

It is often the case that safety seat harness straps, such as, for example, the straps of a five-point harness for securing a child in a car safety seat, become twisted. This twisting prevents the straps from properly passing through their intended orifices, and/or from being elongated or shortened to appropriately buckle a child into the seat. As a result, the user of the car seat may be prevented from properly adjusting the straps, making it difficult to safely secure a child into the seat and fasten the straps using their corresponding clips or buckles.

Accordingly, there is a need for a device that prevents unwanted twisting of the safety seat straps, and a method for using same.

SUMMARY

A device for preventing twisting of a strap, according to an exemplary embodiment of the present invention, comprises a body portion open at opposite ends to receive the strap through the body portion, wherein the body portion includes: an adjustable portion that is capable of being expanded and retracted to vary a length of the body portion; and a slit extending along a side of the body portion between the ends, wherein a size of the slit is capable of being varied to receive the strap through the slit and into the body portion.

A width of the device may become narrower in directions toward the ends. The device may have a narrower width at the ends than at a central portion of the body.

A method for preventing twisting of a strap of a car seat, according to an exemplary embodiment of the present invention, comprises receiving the strap through a body portion of a device, wherein the body portion includes opposite open ends, and wherein the strap extends through the body portion and protrudes from each of the ends, and positioning the device below at least one of a chest clip and a bottom clip coupled to the strap.

The device may be positioned along a thigh of a person sitting in the car seat.

The method may further comprise varying a length of the body portion by at least one of expanding and retracting an adjustable portion of the body portion.

The method may further comprise inserting the strap into the body portion through a slit extending along a side of the body portion between the ends, and pulling the body apart to open the slit to receive the strap through the slit.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the present invention now will be described more fully hereinafter with reference to the accompanying drawings. This invention may, however, be embodied in many different forms and should not be construed as limited to the embodiments set forth herein.

Referring to FIGS. 1, 2 and 3A-3B, the device comprises a body portion 10, which is open at both ends 12 and 14 to receive a standard car seat strap 20. According to an embodiment, a width W of the opening at the ends 12 and 14 is slightly larger than a width of the strap 20. Alternatively, the width W of the opening is the same as or slightly smaller than a width of the strap to ensure a tight fit so that the device does not slip down the strap 20. According to an embodiment, the width of the device becomes narrower in the directions toward the ends 12, 14 so that the device has a narrower width at the ends than at a central portion of the body 10. The narrower width at the ends 12, 14 also prevents slipping of the device on a strap 20.

Figure 1:
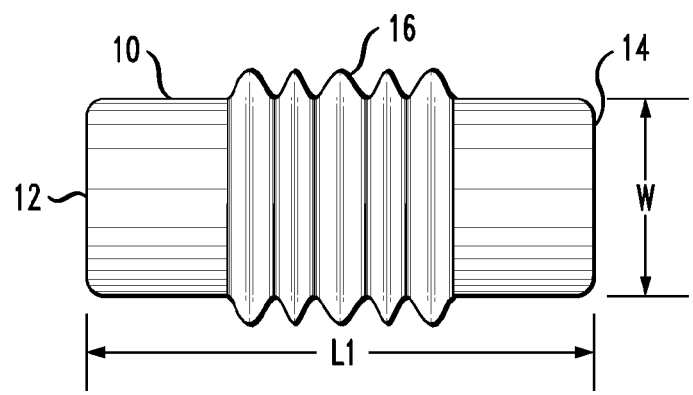
FIG. 1 shows a front side view of a device for preventing twisting of a strap in a retracted state, according to an embodiment of the present invention.

The device includes an adjustable portion 16, which can be expanded by pulling in opposite directions on the ends 12, 14 of the device, and retracted by pushing in opposite directions on the ends 12, 14. According to an embodiment, an end-to-end length L1 of the device in the retracted state shown in FIG. 1 is about 5 inches to about 6 inches, and an end-to-end length L2 is about 7 inches to about 8 inches in the expanded state shown in FIG. 2, but is not limited thereto. According to an embodiment, the device is manufactured as an integral body portion 10 including the ends 12, 14 and the adjustable portion 16 positioned between the ends 12 and 14, and is made of a flexible material, such as, for example, silicone, rubber, or flexible plastic. The flexibility of the device should be sufficient to allow the device to be expanded and retracted upon application of a force, but limited so that the device remains taught once a desired length is obtained.

Figure 3A:
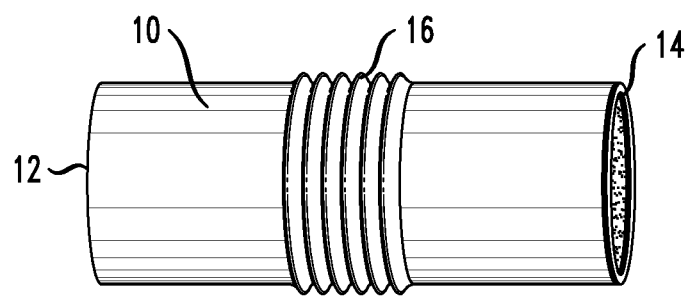
FIG. 3A shows a perspective view of a device for preventing twisting of a strap, according to an embodiment of the present invention.
Figure 3B:
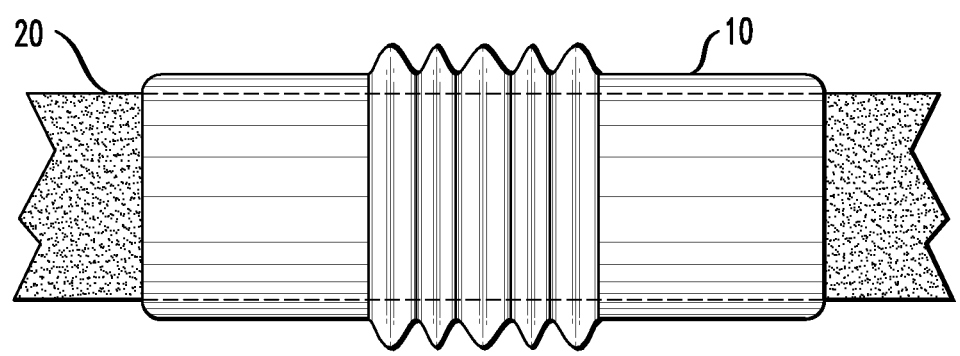
FIG. 3B shows a front side view of a device for preventing twisting of a strap on a strap, according to an embodiment of the present invention.
Figure 4:
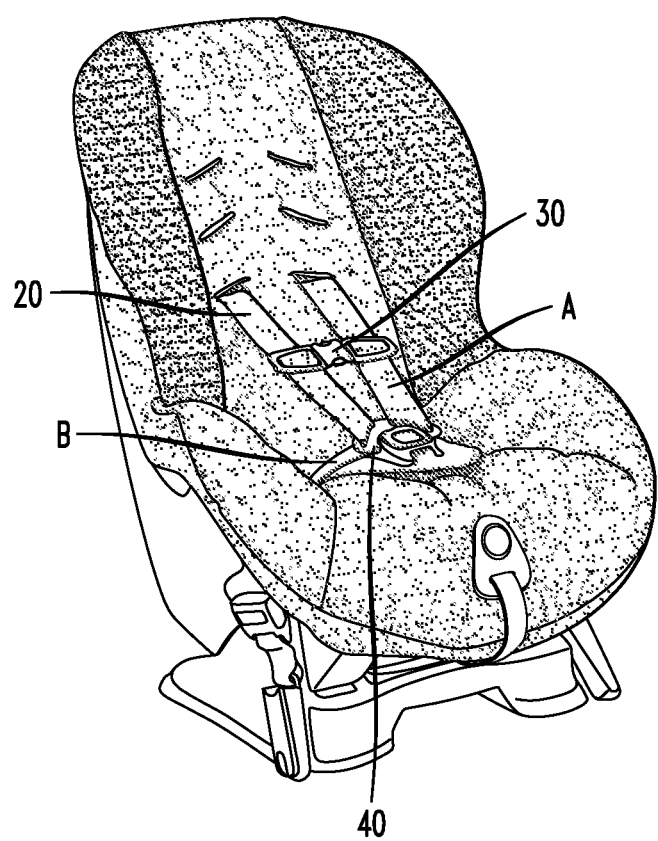
FIG. 4 illustrates a standard car seat to show where the device of FIGS. 1-3 is positioned on a strap of a safety seat, according to an embodiment of the present invention.

Referring to FIGS. 3B and 4, according to an embodiment, the device receives a car seat strap 20 through the ends 12 and 14 of the device so that the strap 20 extends through the body of the device and protrudes from both of the ends 12 and 14. The device is positioned to sit below a chest clip 30 as indicated by arrow A, or under a bottom clip 40 along a child's thigh as indicated by arrow B. According to different embodiments, one or more twist preventing devices may be used. For example, one device may be used on one strap in location A or B, two devices may be used on left and right straps in location A or B, four devices may be used on left and right straps in locations A and B, and any other possible combinations to prevent twisting of the straps 20. The size of the device can be varied by the stretching or compressing the adjustable portion 16 to accommodate the different locations and children of different sizes.

Figure 5:
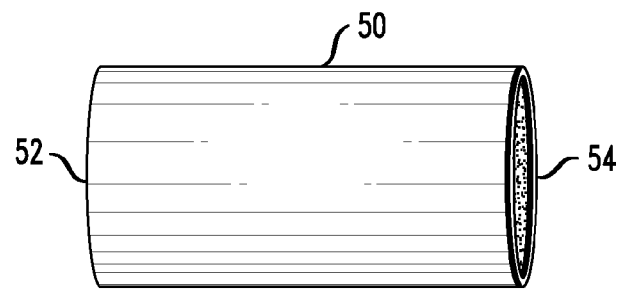
FIG. 5 shows a device for preventing twisting of a strap, according to another embodiment of the present invention.

Referring to FIG. 5, according to another embodiment, the device includes a body portion 50 and ends 52 and 54, but does not include an adjustable portion between the ends 52 and 54. The device is similar to embodiment described in connection with FIGS. 1, 2 and 3A-3B, with the exception that a length of the device in FIG. 5 is not adjustable.

Figure 2:
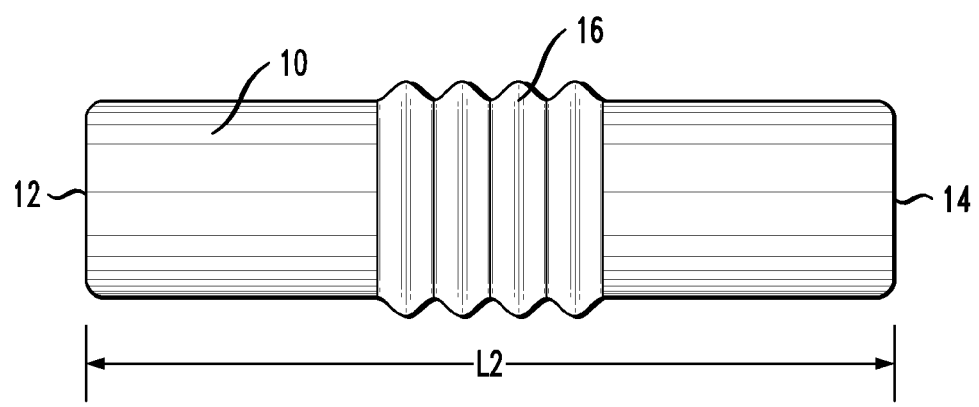
FIG. 2 shows a front side view of a device for preventing twisting of a strap in an expanded state, according to an embodiment of the present invention.
Figure 6:
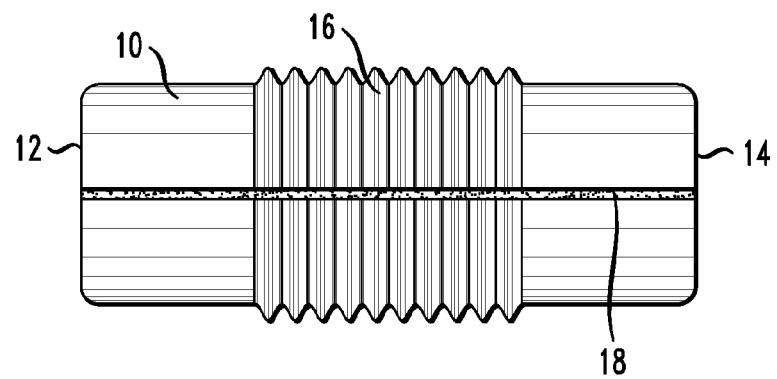
FIG. 6 shows a back side view of a device for preventing twisting of a strap, according to an embodiment of the present invention.

Referring to FIG. 6, a back side of the device of FIGS. 1-3 is shown, according to an embodiment of the present invention. As shown in FIG. 6, the device includes a slit 18 extending across a back side of the body 10 between ends 12 and 14. The slit 18 allows the body to be pulled apart so that the device can be installed on a car seat strap without having to undo the car seat strap from the car seat. Therefore, a user can install the device by inserting the strap 20 through the slit 18 without removing the car seat strap from its corresponding orifices in the seat and without rethreading the strap through those orifices.

Figure 7:
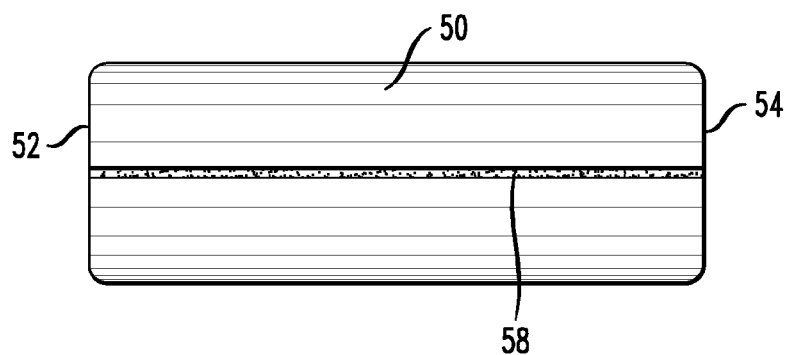
FIG. 7 shows a back side view of a device for preventing twisting of a strap, according to an embodiment of the present invention.

Similarly, in FIG. 7, a back side of the device of FIG. 5 is shown, according to an embodiment of the present invention. As shown in FIG. 7, the device includes a slit 58 extending across a back side of the body 50 between ends 52 and 54. The slit 58 allows the body to be pulled apart so that the device can be installed on a car seat strap without having to undo the car seat strap from the car seat. Therefore, a user can install the device by inserting the strap 20 through the slit 58 without removing the car seat strap from its corresponding orifices in the seat and without rethreading the strap through those orifices.

Although exemplary embodiments of the present invention have been described hereinabove, it should be understood that the present invention is not limited to these embodiments, but may be modified by those skilled in the art without departing from the spirit and scope of the present invention.

What is claimed is:

1. A method for preventing twisting of a single strap of a car seat, the method comprising:
   receiving the single strap through a body portion of a device, wherein the body portion includes opposite open ends, and wherein the single strap extends through the body portion and protrudes from each of the ends;
   positioning the device below at least one of a chest clip and a bottom clip coupled to the single strap, wherein the device is selectively removable from the single strap without removing the single strap from the car seat;
   varying a length of the body portion by at least one of expanding and retracting an adjustable portion of the body portion; and
   inserting the single strap into the body portion through a slit extending along a side of the body portion between the ends, wherein the slit extends through the adjustable portion.

2. The method according to claim 1, wherein the device is positioned along a thigh of a person sitting in the car seat.

3. The method according to claim 1, further comprising pulling the body apart to open the slit to receive the strap through the slit.

4. The method according to claim 1, wherein the body portion is cylindrical.

5. The method according to claim 1, wherein the single strap is a standard car seat strap.

6. The method according to claim 1, wherein a width of each of the opposite open ends is the same as a width of the single strap.

7. The method according to claim 1, wherein a width of each of the opposite open ends is less than a width of the single strap.

8. The method according to claim 1, wherein the device remains taught after a desired length is obtained.

9. A method for preventing twisting of a single strap of a car seat, the method comprising:
   receiving the single strap through a cylindrical and non-adjustable body portion of a device, wherein the body portion includes opposite open ends, and wherein the single strap extends through the body portion and protrudes from each of the ends;
   positioning the device below at least one of a chest clip and a bottom clip coupled to the single strap, wherein the device is selectively removable from the single strap without removing the single strap from the car seat; and
   inserting the single strap into the body portion through a slit extending along a surface of the cylindrical and non-adjustable body portion between the ends.

* * * * *